(12) United States Patent
Kemp

(10) Patent No.: US 9,800,936 B2
(45) Date of Patent: *Oct. 24, 2017

(54) APPARATUS, SYSTEMS AND METHODS FOR ACCESSING AN INITIAL PORTION OF A MEDIA CONTENT EVENT

(71) Applicant: EchoStar Technologies L.L.C., Englewood, CO (US)

(72) Inventor: Geoffrey Kemp, Centennial, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/243,774

(22) Filed: Aug. 22, 2016

(65) Prior Publication Data

US 2016/0360275 A1    Dec. 8, 2016

Related U.S. Application Data

(60) Continuation of application No. 14/136,301, filed on Dec. 20, 2013, now Pat. No. 9,426,516, which is a division of application No. 13/030,905, filed on Feb. 18, 2011, now Pat. No. 8,689,258.

(51) Int. Cl.
| | |
|---|---|
| *H04N 21/43* | (2011.01) |
| *H04N 21/472* | (2011.01) |
| *H04N 21/2225* | (2011.01) |
| *H04N 21/231* | (2011.01) |
| *H04N 21/433* | (2011.01) |
| *H04N 21/63* | (2011.01) |
| *H04N 21/41* | (2011.01) |
| *H04N 21/432* | (2011.01) |

(52) U.S. Cl.
CPC ... *H04N 21/47202* (2013.01); *H04N 21/2225* (2013.01); *H04N 21/23106* (2013.01); *H04N 21/4104* (2013.01); *H04N 21/432* (2013.01); *H04N 21/4331* (2013.01); *H04N 21/472* (2013.01); *H04N 21/632* (2013.01)

(58) Field of Classification Search
None
See application file for complete search history.

(56) References Cited

U.S. PATENT DOCUMENTS

| | | | |
|---|---|---|---|
| 6,774,924 B2 * | 8/2004 | Kato | G02B 26/125 347/244 |
| 7,633,887 B2 | 12/2009 | Panwar et al. | |
| 7,680,894 B2 | 3/2010 | Diot et al. | |
| 7,818,368 B2 | 10/2010 | Yang et al. | |

(Continued)

*Primary Examiner* — Cai Chen

(57) ABSTRACT

Systems and methods are operable to retrieve a previously broadcast initial portion of a media content event. An exemplary embodiment stores a media content event at a first media device as the media content event is communicated over a broadcast system; receives a request at the first media device from a second media device, wherein the request identifies an initial portion of a media content event that has previously been communicated over a broadcast system; identifies the initial portion of the media content event from the stored media content event; retrieves the identified initial portion of the media content event; and communicates the initial portion of the media content event from the first media device to the second media device.

19 Claims, 4 Drawing Sheets

(56) References Cited

U.S. PATENT DOCUMENTS

| | | |
|---|---|---|
| 2003/0118014 A1* | 6/2003 | Iyer ..................... H04N 5/782 370/389 |
| 2006/0190615 A1 | 8/2006 | Panwar et al. |
| 2007/0157253 A1 | 7/2007 | Ellis et al. |
| 2008/0022012 A1 | 1/2008 | Wang |
| 2008/0086743 A1* | 4/2008 | Cheng ..................... H04N 5/76 725/38 |
| 2009/0150941 A1 | 6/2009 | Riedl et al. |
| 2009/0276803 A1 | 11/2009 | Weaver |

* cited by examiner

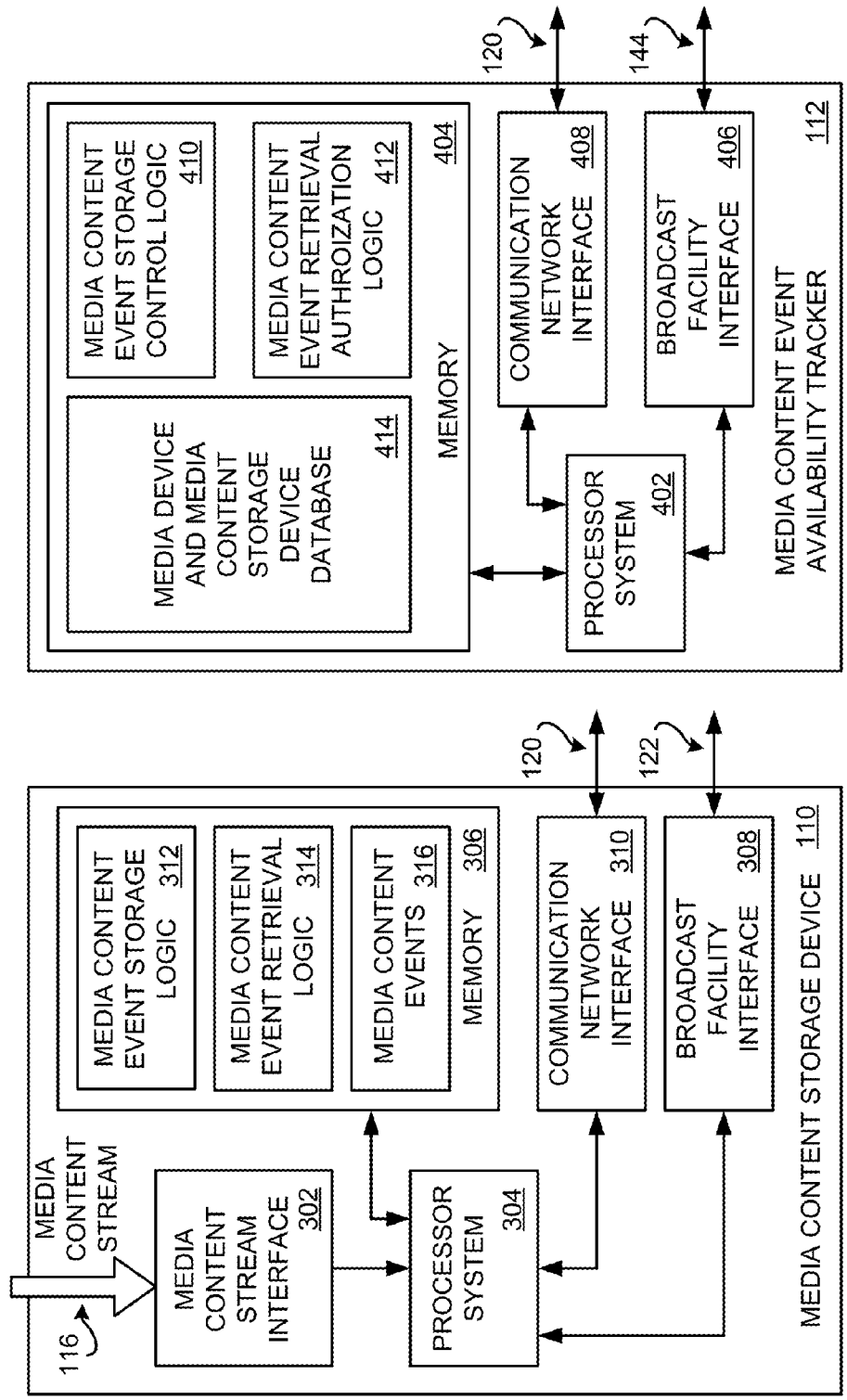

APPARATUS, SYSTEMS AND METHODS FOR ACCESSING AN INITIAL PORTION OF A MEDIA CONTENT EVENT

PRIORITY CLAIM

This patent application is a Continuation of U.S. Non-Provisional patent application Ser. No. 14/136,301, filed Dec. 20, 2013, published as U.S. Publication No. 2014/0109155, entitled "APPARATUS, SYSTEMS AND METHODS FOR ACCESSING AN INITIAL PORTION OF A MEDIA CONTENT EVENT," issued as U.S. Pat. No. 9,426,516 on Aug. 23, 2016, which is a Divisional of U.S. Non-Provisional patent application Ser. No. 13/030,905, filed Feb. 18, 2011, published as U.S. Publication No. 2012/0216234, and entitled "APPARATUS, SYSTEMS AND METHODS FOR ACCESSING AN INITIAL PORTION OF A MEDIA CONTENT EVENT," issued as U.S. Pat. No. 8,689,258 on Apr. 1, 2014, the contents of which are herein incorporated by reference in their entirety.

BACKGROUND

Media devices, such as a set top box, are configured to receive media content events from a broadcasting system. Non-limiting examples of media content events include movies, news programs, sporting events, serial comedies or dramas, and other program events that are communicated to the media device by a program service provider over the broadcasting system. Non-limiting examples of broadcasting systems include satellite systems, cable or other wire-based systems, or over the air (OTA) broadcasting systems.

The media content events are communicated to the media device in the form of content streams. The timing of the communication of the media content stream coincides with the scheduled presentation times of the particular media content event. For example, if a scheduled presentation time of a movie is 8:00 p.m. on a particular day, then the media content stream that includes the beginning of the movie is received at the media device at 8:00 p.m., or shortly before 8:00 p.m. so as to provide sufficient time for processing, on the scheduled presentation day.

Typically, the media content event schedules are indicated on an electronic program guide (EPG). The EPG indicates the presentation start time and date for each of the available media content events. Further, the EPG indicates the ending time of presentation of the media content event, title of the media content event, the channel that the media content event is available on, a brief description of the subject matter of the media content event, and/or other information of interest. A user, by navigating about the EPG, may select media content events of interest for immediate presentation and/or for storage in a memory medium, such as a digital video recorder (DVR) in the media device. Future scheduled media content events may also be selected for presentation and/or storage by selecting such future media content events via the EPG.

Often, the user selects a particular media content event for immediate presentation and/or storage after the media content event has started. That is, the user initiates presentation and/or storage at a time after the scheduled beginning of the media content event. Since the initial portion of the media content event has already been broadcast (from its beginning up to the time that the user selects the media content event for presentation and/or storage), the user will not be able to access the initial portion of the selected media content event.

For example, the user may be channel surfing or may be viewing a media content event that is no longer of interest. The user, by changing channels or by navigating about the presented EPG, may initiate presentation and/or storage of the newly selected media content event. The channel change or EPG selection causes the media device to present the newly selected media content event starting at a point in its presentation schedule that corresponds to the current time. For example, the user may select the movie (that was originally scheduled to begin presentation at 8:00 p.m.) at 8:10 p.m. Accordingly, the initial ten minutes of the movie will not be available for presentation to the user since this initial portion of the movie has already been communicated to the media device over the broadcast system. There is no practical way for the media content system to access the missed initial portion of the newly selected media content event.

Accordingly, there is a need in the arts to allow a media device to access a missed initial portion of a selected media content event.

SUMMARY

Systems and methods of retrieving a previously broadcast initial portion of a media content event are disclosed. An exemplary embodiment stores a media content event at a first media device as the media content event is communicated over a broadcast system; receives a request at the first media device from a second media device, wherein the request identifies an initial portion of a media content event that has previously been communicated over a broadcast system; identifies the initial portion of the media content event from the stored media content event; retrieves the identified initial portion of the media content event; and communicates the initial portion of the media content event from the first media device to the second media device.

Another exemplary embodiment receives a user specification for the media content event at a first media device, wherein an initial portion of the media content event has previously been communicated over a broadcast system; receives a remaining portion of the media content event over the broadcast system; stores the remaining portion of the media content event at the first media device; communicates a request for the initial portion of the media content event to a second media device, wherein the second media device has stored the initial portion of the media content event during broadcast of the initial portion over the broadcast system; and receives the initial portion of the media content event from the second media device.

BRIEF DESCRIPTION OF THE DRAWINGS

Preferred and alternative embodiments are described in detail below with reference to the following drawings:

FIG. 3 is a block diagram of an exemplary embodiment of the content storage device;

FIG. 4 is a block diagram of an exemplary embodiment of the media content event availability tracker;

DETAILED DESCRIPTION

Figure 1:
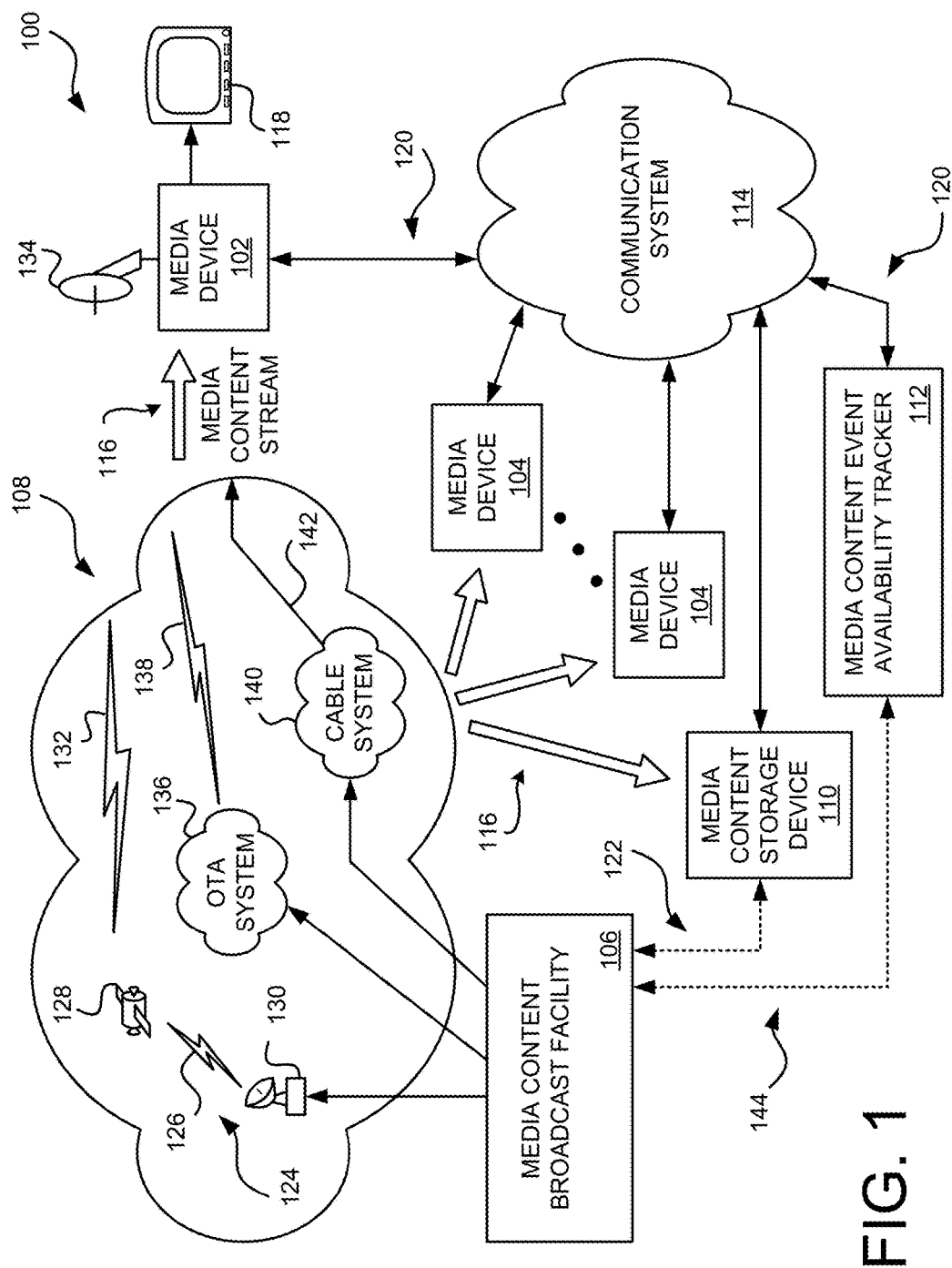
FIG. 1 is a block diagram of an embodiment of a media content event recovery system.

FIG. 1 is a block diagram of an embodiment of a media content event recovery system 100. The exemplary embodiment of the media content event recovery system 100 is implemented in an exemplary environment that comprises a media device 102, a plurality of other media devices 104, a media content broadcast facility 106, a broadcast system 108, an optional media content storage device 110, a media content event availability tracker 112, and a communication system 114. The media devices 102, 104 receive a media content stream 116 provided from the media content broadcast facility 106 over the broadcast system 108. The media content stream 116 is provided by a media content service provider.

An exemplary media device 102 includes, but is not limited to, a set top box (STB) that is communicatively coupled to the broadcast system 108. Other embodiments of the media device 102 include a television (TV), a digital video disc (DVD) player, a digital video disc (DVD) recorder, a game playing device, or a personal computer (PC). The media devices 102, 104 are configured to present and/or store selected media content events that are received in the media content stream 116.

The media content stream 116 comprises a plurality of streamed media content events. Some media content broadcast facilities 106 simultaneously broadcast many media content events, even hundreds of broadcast media content events, in the media content stream 116. The media devices 102, 104, when in operation, are configured by a user to select one of the plurality of simultaneously broadcast media content events for presentation on a media presentation device 118. Exemplary media presentation devices 118 include, but are not limited to, TV's, stereos, radios, surround sound systems, personal computers or the like that may be communicatively coupled to the media device 102, 104 that is receiving the media content stream 116. In some embodiments, the media device 102 and the media presentation device 118 may be an integrated single electronic device.

In some situations, presentation of the selected media content event is underway at the time that the user selects the media content event for presentation. Accordingly, when the media device 102 determines that presentation of the media content event is already underway such that the initial portion of the selected media content event (as measured from a beginning of its presentation time and/or its initial communication to the media device 102, up to the time that the user selects the media content event for presentation and/or storage) has already been communicated in the media content stream 116 and/or is no longer available for presentation on the media presentation device 118. Since the media device 102 has not stored the previously communicated initial portion of the selected media content event, the media device 102 is not able to access and present the initial portion of the selected media content event. Embodiments of the media content event recovery system 100 are configured to enable the media device 102 to access an initial portion of a selected currently presented media content event that has been previously broadcasted.

In operation, and exemplary embodiment receives a user specification for the media content event at a media device 102, wherein an initial portion of the media content event has previously been communicated over the broadcast system 108. The media device 102 receives a remaining portion of the media content event over the broadcast system 108, stores the remaining portion of the media content event at the media device 102, and communicates a request for the initial portion of the media content event to a second media device 104. The second media device 104 has stored the initial portion of the media content event during broadcast of the initial portion over the broadcast system 108. Accordingly, the media device 102 receives the initial portion of the media content event from the second media device 104.

An exemplary embodiment is configured to enable the media device 102 to obtain the initial portion of the currently presented media content event that has been saved on another media device 104 and/or the optional media content storage device 110. In the various embodiments, the media content storage device 110 is itself a specialized type of media device.

The media device 102 establishes a communication link 120, over the communication system 114, to a selected media device 104 and/or to the media content storage device 110 that has stored the initial portion of the media content event. Once the communication link 120 is established between the media device 102 and the selected media device 104, and/or the media content storage device 110, the media device 102 requests accesses to and/or communication of the initial portion of the media content event. The selected media device 104 and/or the media content storage device 110 communicates at least the initial portion of the media content event to the media device 102. In an exemplary embodiment, once the media device 102 begins to receive the initial portion of the media content event from the selected media device 104 and/or the media content storage device 110 via the communication system 114, and the media device 102 may begin presentation of the initial portion of the media content event at its beginning.

An exemplary embodiment of the media device 102 concurrently saves the remaining portion of the media content event that is being currently received in the media content stream 116 for later presentation. Upon conclusion of presentation of the received initial portion of the media content event, presentation of the stored remaining portion of the media content event is initiated by the media device 102. Accordingly, the user is presented the initial portion of the media content event, followed by the stored remaining portion of the media content event, such that the user is presented the media content event in its entirety.

In the various embodiments, the media devices 104 receive the media content stream 116 over the broadcast system 108. The media content devices 104 may be identical to, or may be substantially similar to, the media device 102. Or, the media devices 102, 104 may be quite different from each other. Further, the media devices 102, 104 may be coupled to different broadcast system types.

In the various embodiments, the optional media content storage device 110 may also receive the media content stream 116 over the broadcast system 108. The media content storage device 110 is configured to receive and store initial portions of a designated plurality of media content events as they are being communicated to the media devices 102, 104 via the media content stream 116.

Alternatively, or additionally, the media content storage device 110 may receive the media content events directly from the media content broadcast facility 106 over a communication link 122. The communication link 122 may be a dedicated communication link, such as an Ethernet communication link, a fiber optic communication link, a wireless link, a cable link, or the like. In some embodiments, the link 122 may be established through the communication system 114, or may be established through a portion of the communication system 114. In embodiments that directly receive media content events, the media content events may be communicated to the optional media content storage device 110 at any time.

In the various embodiments, a plurality of media content events are broadcast to the media devices 102, 104 over the broadcast system 108. Broadcasting is the communication of media content to media devices 102, 104, in an open ended fashion. The media content is broadcast over a dispersed, open ended destination, audience wherein any particular ones of the media devices 102, 104 may receive the broadcast media content. The media devices 102, 104 are configured by their respective user to receive the broadcast media content via the broadcast system 108. To receive the media content, the media devices 102, 104 are "tuned" to receive media content of interest.

An exemplary broadcast system 108 comprises a satellite broadcast system 124. One or more of the media content streams 116 reside in a transport channel 126 that is uplinked to a plurality of satellites 128, via a corresponding transmit antenna 130. The respective transport channels are then communicated, in the form of a wireless signal 132, from one or more of the satellites 128 down to a receiver antenna 134 that is communicatively coupled to the media device 102. The received wireless signal 132 (with the media content stream 116) is then communicated from the receiver antenna 134 to the media device 102. The receiver antenna 134 and the media device 102 may be configured to receive multiple wireless signals 132 from a plurality of satellites 128. The other media devices 104 and/or the media content storage device 110 may similarly receive the media content stream 116 over the satellite broadcast system 124.

Alternatively, or additionally, the plurality of media content events may be broadcast to the media devices 102, 104 via an over the air (OTA) system 136. For example, the media content broadcast facility 106 may be a local program provider that broadcasts media content events to the media devices 102, 104 using a wireless signal 138. The received wireless signal 138 with the media content stream 116 is received at the receiver antenna 134, or may be received directly by a receiver (not shown) residing in the media device 102. The media devices 104 and/or the media content storage device 110 may similarly receive the media content stream 116 via OTA system 136.

Alternatively, or additionally, the plurality of media content events may broadcast to the media devices 102, 104 via a cable system 140. For example, the media content broadcast facility 106 may employ a coaxial cable and/or fiber optic cable 142 that is coupled to the media device 102. The media content stream 116 is received directly by the media device 102. The media devices 104 and/or the media content storage device 110 may similarly receive the media content stream 116 over the cable system 140.

The media content event availability tracker 112 is configured to manage the distribution of the initial portions of the designated plurality of media content to a plurality of requesting media devices 102. Accordingly, the media content event availability tracker 112 performs a variety of functions. The media content event availability tracker 112 tracks which initial portions of the designated plurality of media content events are available from the various media devices 104 and/or the one or more media content storage devices 110. In some embodiments, the media content event availability tracker 112 may cause a selected media device 104 and/or the media content storage device 110 to save the initial portion of a specified media content event as it is being broadcast over the broadcast system 108. In some embodiments, the media content event availability tracker 112 provides information to a requesting media device 102 that identifies one or more of the media devices 104 and/or the media content storage device 110 that may provide the initial portion of the requested media content event. The information provided to the requesting media device 102 may include communication link information that is used by the requesting media device 102 to establish the communication link 120 with a particular one of the media devices 104 and/or the media content storage device 110 that has the initial portion of the requested media content event. Some embodiments of the media content event availability tracker 112 are configured to establish a communication link 144 to the media content broadcast facility 106, or another facility, so that ancillary services and/or functionality may be provided. For example, users may be charged a fee, or may pay for the service on a monthly basis or the like, for receiving requested initial portions of the selected media content event. The media content event availability tracker 112 may communicate usage information and/or other information back to a billing center so that the services may be tracked and/or managed.

In practice, a user operates their media device 102 to access a particular media content event from the received media content stream 116. In the event that the initial portion of the requested media content event has already been broadcast from the media content broadcast facility 106, the media device 102 will not have access to the initial portion of the requested media content event. In an exemplary embodiment, the user operates their media device to open the communication link 120 and establish communication with the media content event availability tracker 112. Alternatively, or additionally, embodiments may be configured to automatically establish the communication link 120 with the media content event availability tracker 112.

The media device 102 indicates to the media content event availability tracker 112 the identity of the media content event of interest and requests receipt of the initial portion of the media content event. The identity of the media content event may be based upon any suitable identifier of the media content event, such as its title, its program identifier, its channel, its starting time, or the like. In some embodiments, the media device 102 also specifies the duration of the initial portion of the requested media content event to the media content event availability tracker 112. In other embodiments, the duration of the initial portion is determinable based on information provided by the media device 102.

The media content event availability tracker 112 comprises a database that monitors, tracks, and/or otherwise identifies which of the media devices 104 and/or the media content storage device 110 have stored the requested initial portion of the identified media content event. The media content event availability tracker 112 then communicates a reply to the requesting media device 102. The reply identifies at least one of the media devices 104 and/or the media content storage device 110 that has stored the requested initial portion of the media content event.

Based on the received reply information, the requesting media device 102 establishes a communication link 120 to at least one of the identified media devices 104 and/or the media content storage device 110. Once the communication link 120 is established to a particular one of the media devices 104 and/or the media content storage device 110, the media device 102 requests the initial portion of the media content event. The initial portion of the requested media content event is then communicated from the media device 104 and/or the optional media content storage device 110 to the requesting media device 102. In an exemplary embodiment, once a sufficient amount of the initial portion of the requested media content event has been received by the media device 102, presentation of the initial portion of the media content event may begin.

In an exemplary embodiment, after the initial portion of the requested media content event has been received by the requesting media device 102, an exemplary embodiment closes the communication link 120. Accordingly, the media device 104 and/or the optional media content storage device 110 that provided the initial portion of the selected media content event to the requesting media device 102 may then be available to provide the initial portion of the selected media content event to another requesting media device 102.

Figure 2:
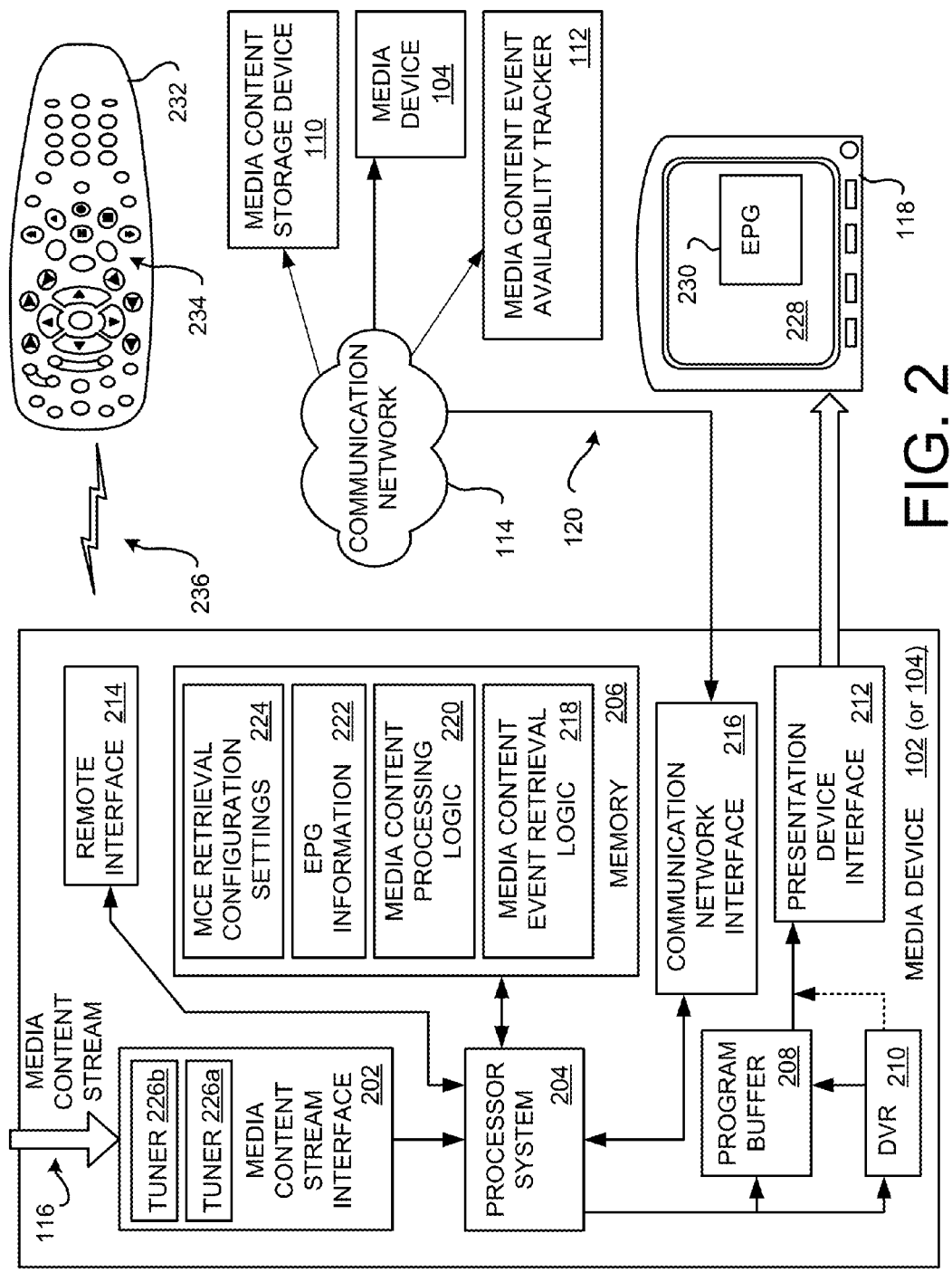
FIG. 2 is a block diagram of an exemplary media device.

FIG. 2 is a block diagram of an exemplary media device 102 (or 104) that is configured to request and receive the initial portion of a specified media content event. The non-limiting exemplary media device 102 comprises a media content stream interface 202, a processor system 204, a memory 206, a program buffer 208, an optional digital video recorder (DVR) 210, a presentation device interface 212, a remote interface 214, and a communication network interface 216. The memory 206 comprises portions for storing media content event retrieval logic 218, media content processing logic 220, electronic program guide (EPG) information 222, and media content event (MCE) retrieval configuration settings 224. In some embodiments, the media content event retrieval logic 218 and the media content processing logic 220 may be integrated together, and/or may be integrated with other logic. Other media devices 102, 104 may include some, or may omit some, of the above-described media processing components. For example, the media device may comprise and/or be coupled to any suitable recorder that stores media content on a memory medium, such as the exemplary DVR 210. Further, additional components not described herein may be included in alternative embodiments of the media device 102. Further, embodiments of the media device 104 may comprise these components and/or may comprise other components.

The functionality of the media device 102, here a set top box, is now broadly described. One or more media content streams 116 are delivered via the broadcast system 108 that is operated by the media content provider. The one or more media content streams 116 are received by the media content stream interface 202. One or more tuners 226a, 226b in the media content stream interface 202 selectively tune to one of the media content streams 116 in accordance with instructions received from the processor system 204. The processor system 204, executing the media content processing logic 220, and based upon a request for a selected media content event of interest specified by a user, operates the media content stream interface 202 to receive a selected media content event, and parses out program content associated with a selected media content event of interest. The media content event of interest is then assembled into a stream of video and/or audio information which may be stored by the program buffer 208 such that the media content event can be streamed out to the media presentation device 118 via the presentation device interface 212. Alternatively, or additionally, the processor system 204 may operate the recorder so that the parsed out program content is saved into the DVR 210 for later presentation. The DVR 210 may be directly provided in, locally connected to, or remotely connected to, the media device 102.

The program buffer 208 is configured to store a predefined duration of the media content event of interest. An exemplary program buffer 208 may store as much as two hours of media content in its memory medium (not shown). In some embodiments, the program buffer 208 is incorporated into, or is a virtual portion of, the DVR 210.

In this simplified embodiment, the presentation device interface 212 is illustrated as coupled to a media presentation device 118 that includes a display 228, such as a television (hereafter, generically a TV). The video portion of the streamed media content event of interest is displayed on the display 228. The audio portion of the streamed media content event of interest is reproduced as sounds by speakers (not shown).

From time to time, information populating the EPG information 222 residing in the memory 206 is communicated to the media device 102, via the media content stream 116 or via another suitable media. The EPG information 222 stores the information pertaining to the scheduled programming of available media content events. The information may include, but is not limited to, a scheduled presentation start and/or end time, a program channel, and descriptive information. The media content event's descriptive information may include the title of the media content event, names of performers or actors, date of creation, and a summary describing the nature of the media content event. Any suitable information may be included in the media content event's supplemental information. Upon receipt of a command from the user requesting presentation of an EPG 230 on the display 228, media content event information stored in the EPG information 222 is retrieved, formatted, and then presented on the display 228 as the EPG 230. The EPG 230 may also indicate which media content events have available initial portions.

The exemplary media device 102 is configured to receive commands from a user via a remote control 232. The remote control 232 includes one or more controllers 234. The user, by actuating one or more of the controllers 234, causes the remote control 232 to generate and transmit commands, via a wireless signal 236, to the media device 102. The commands control the media device 102 and/or control the media presentation device 118. The wireless signal 236 may be an infrared signal or an RF signal. Accordingly, the remote interface 214 is configured to receive the wireless signal 236 emitted by the exemplary remote control 232.

The remote control 232, in an exemplary embodiment, may be used by the user to navigate about the EPG 230 to select a particular media content event of interest. Or, the user may selectively change viewed channels, such as when channel surfing or switching to a particular channel of interest. Upon selection of a particular media content event via the EPG 230 or upon selection of a new channel, presentation of the selected media content event of interest (or the currently presented media content event on the new channel) begins nearly immediately, and begins at a point that corresponds to the currently broadcasted and received portion of the media content event being received in the media content stream 116. In some embodiments, the currently received remaining portion of the media content event is stored in the program buffer 208 and/or the DVR 210.

In the event that processor system 204 determines that presentation of the media content event is already underway such that the initial portion is not available over the broadcast system 108, an exemplary embodiment permits the user to request the initial portion of the media content event of interest from another media device 104 and/or the optional media content storage device 110. An exemplary embodiment of the remote control 232 includes one or more of the controllers 234 that are configured to initiate the process of retrieving the initial portion of the media content event of interest. Additionally, or alternatively, the controllers 234 may be configured to pre-set the media device 102 to automatically initiate the process of retrieving the initial portion of the media content event of interest. Further, a selection may be made to initiate the process of retrieving the initial portion by operating the controllers 234 to navigate about the presented EPG 230.

For example, the user may change the active tuner 226a, 226b to a new channel. After viewing the currently received portion of the media content event being presented by the new channel, the user may conclude that they are interested in viewing the entirety of the media content event. Accordingly, the user may then operate their remote control 232 to initiate the process of retrieving the initial portion of the selected media content event.

As another example, the user may be viewing choices of available media content events on the EPG 230. The user may become interested in viewing one of the available media content events that has already started. Rather than starting presentation at the currently received point in the broadcast media content stream 116, the user may operate their remote control 232 to initiate the process of retrieving the initial portion of the selected media content event.

Embodiments of the communication network interface 216 are configured to communicatively couple the media device 102 with the media content event availability tracker 112, the media devices 104, and/or the media content storage device 110, via the communication system 114. The communication network interface 216 may be any suitable communication device, component, or system operable to communicate over the communication system 114.

The communication system 114 is illustrated as a generic communication system. In one embodiment, the communication system 114 comprises the Internet. Accordingly, the communication network interface 216 is a modem or other type of Internet communication device. Alternatively, the communication system 114 may be a telephony system, a radio frequency (RF) wireless system, a microwave communication system, a fiber optics system, an intranet system, a local access network (LAN) system, an Ethernet system, a cable system, a cellular system, or a hybrid system comprised of multiple types of communication media. In such embodiments, the communication network interface 216 is configured to establish the communication link 120 with the communication system 114 on an as-needed basis, and is configured to communicate over the particular type of communication system 114 that it is coupled to. In some embodiments, portions of the communication system 114 may employ portions of the broadcast system 108.

The media content processing logic 220 manages the various media processing functions. For example, but not limited to, media content processing logic 220 may manage the processing the received media content stream 116, manage the tuners 226a, 226b, assemble the currently presented media content event into a video stream and audio stream that is communicated to one or more media presentation devices 118, store currently presented media content events and/or selected media content events into the program buffer 208 and/or the DVR 210, process user instructions communicated from the remote control 232, construct a presentable EPG 230 based on the EPG information 222, and/or perform other functionality of the media device 102.

The MCE retrieval configuration settings 224 comprise a data storage repository for information that is used by the media device 102 to retrieve the initial portion of the selected media content event from the media devices 104 and/or the optional media content storage devices 110. For example, a web site address or other identifier of the media content event availability tracker 112 may be saved in the MCE retrieval configuration settings 224 to facilitate establishment of the communication link 120 between the media device 102 and the media content event availability tracker 112. User preferences may be stored in the MCE retrieval configuration settings 224. For example, but not limited to, the user may configure the media device 102 to automatically initiate retrieval of the initial portion of the selected media content event when the media content event is selected from the EPG 230 and/or when a new channel is selected. Further, the user may specify that the automatic retrieval of the initial portion is to occur if the media content event is selected within some predefined duration measured from its beginning presentation time. For example, but not limited to, the media device 102 may be configured to automatically retrieve the initial portion of the selected media content event if the media content event is selected for presentation within five minutes, or some other predefined duration, of its beginning time. Such user preferences may be specified by the user on a GUI interface or the like that is presented on the media presentation device 118.

The media content event retrieval logic 218 provides the logic, when executed by the processor system 204, to manage retrieval of an initial portion of the selected media content event. For example, the media content event retrieval logic 218 may process an instruction to retrieve the initial portion of the selected media content event received from the remote control 232 or another input device.

The media content event retrieval logic 218 may manage the establishment of the communication link 120 between the media device 102 and the media content event availability tracker 112. In some embodiments, multiple media content event availability trackers 112 may be available. A plurality of media content event availability trackers 112 may be used to accommodate different geographic regions and/or to accommodate different technologies of the communication system 114. Thus, an identity and/or communication link establishment instructions may be retrieved from the MCE retrieval configuration settings 224 so that the request for the initial portion of the selected media content event is communicated to a preferred media content event availability tracker 112, or to an alternative media content event availability tracker 112 in situations where the preferred media content event availability tracker 112 is not available.

The media content event retrieval logic 218 may manage generation and/or communication of the request made to the media content event availability tracker 112 for the initial portion of the selected media content event. The media content event retrieval logic 218 may generate the request based upon the identity of the media content event. In some embodiments, the request may optionally include a specified duration of the initial portion. In other embodiments, the duration of the initial portion is determinable based on information provided by the media device 102.

The media content event retrieval logic 218 may manage the processing of the reply received from the media content event availability tracker 112. For example, upon receiving the reply from the media content event availability tracker 112 that identifies one or more of the media devices 104 and/or the optional media content storage devices 110 that may provide the initial portion, the media content event retrieval logic 218 may manage the establishment of the communication link 120 between the media device 102 and the media devices 104 and/or the optional media content storage devices 110, and may manage the request for the initial portion of the selected media content event. When multiple ones of the media devices 104 and/or the optional media content storage devices 110 are available to provide the initial portion of the selected media content event, then the media content event retrieval logic 218 may manage the selection of which particular one of the media devices 104 and/or the optional media content storage devices 110 will be accessed. In situations where the preferred media device 104 and/or the optional media content storage device 110 is not available, the media content event retrieval logic 218 may manage selection of, and connection to, an alternative one of the media devices 104 and/or the optional media content storage devices 110.

The media device 104 may be the same as, or similar to, the media device 102. In some embodiments, when a user of the media device 104 is viewing a particular media content event, the media device 104 saves the media content event into its program buffer 208 and/or its DVR 210. In some embodiments, a currently present media content event is automatically saved into the program buffer 208 (and/or the DVR 210) so that the user or the media device 104 can perform various trick functions on the media content event. Exemplary trick functions include, but are not limited to, pausing, rewinding, fast forwarding, jumping forwards or backwards, or the like.

An exemplary embodiment of the media device 104 may be configured to automatically establish a communication link 120 to the media content event availability tracker 112 and report that it has stored the initial portion of the media content event that has been selected by its respective user. Then, when the media device 102 requests that initial portion of that particular media content event, the media content event availability tracker 112 may provide information, such as the identity of that media device 104, to the requesting media device 102.

In some embodiments, if the user of the media device 104 changes to a different channel or different media content event, the media device may retain the stored initial portion of that particular media content event. In an exemplary embodiment, the stored initial portion of the media content event may be retained in its program buffer 208 after its respective user changes to a different channel and/or views a different media content event. In another embodiment, the stored initial portion of the media content event may be transferred from its program buffer 208 to its DVR 210 when its respective user changes to the different channel and/or views the different media content event. In some embodiments where the media device 104 has two or more tuners 226, an unused one of the tuners 226 can continue to save the initial portion of that particular media content event.

Some embodiments of the media device 104 may be configured to receive instructions from the media content event availability tracker 112 that cause the media device 104 to access and store an initial portion of a specified media content event. For example, but not limited to, the media device 104 may respond to a query or the like from the media content event availability tracker 112. If the media device 104 is available to store the initial portion of a specified media content event, the media device 104 may respond to the media content event availability tracker 112. Additionally, or alternatively, the media device 104 may also report back to the media content event availability tracker 112 information that indicates successful storing of the initial portion of the specified media content event. Further, some embodiments of the media device 104, when operating, may notify which media content event initial portions have been stored by that particular media device 104.

The received instruction causes the media device 104 to operate one of its tuners 226 to receive the specified media content event, and then store the initial portion of the media content event into its program buffer 208 and/or its DVR 210. For example, the media device 104 may contact the media content event availability tracker 112 and report that it has one or more available tuners 226 that could be used to access one or more different media content events. The media content event availability tracker 112, while concurrently coordinating storage of many different initial portions of different media content events with other media devices 104, may provide instructions to a particular media device 104 to store an initial portion of a specified media content event.

In some embodiments, the media device 104 may be operating in a standby mode. That is, the media device 104 may not be in current use by its respective user. In such embodiments, the media device 104 may be configured to begin operation in response to an instruction received from the media content event availability tracker 112 so as to store the initial portion of a specified media content event. Further, the media device 104 may be configured to allow the media device 102 to establish the communication link 120 to the media device 104, and then cause the media device 104 to communicate the initial portion of the media content event to the requesting media device 102.

In some embodiments, the media device 104 may manage erasure, deletion, or removal of previously stored initial portion of the selected media content events. For example, after conclusion of a particular media content event, an exemplary embodiment may be configured to delete, erase, or otherwise remove the stored initial portion of that particular media content event. Alternatively, or additionally, stored initial portions of the selected media content events may be retained for a predefined duration. Upon expiration of the duration, the initial portion of the selected media content event may be deleted, erased, or otherwise removed.

FIG. 3 is a block diagram of an exemplary embodiment of the media content storage device 110. The exemplary media content storage device 110 is configured to receive and store a plurality of media content events, and respond to requests to communicate a selected initial portion of a specified media content event to a connecting media device 102. The non-limiting exemplary media content storage device 110 comprises an optional media content stream interface 302, a processor system 304, a memory 306, an optional broadcast facility interface 308, and a communication network interface 310. The memory 306 comprises portions for media content event storage logic 312, media content event retrieval logic 314, and media content events 316. In some embodiments, the media content event storage logic 312 and the media content event retrieval logic 314 may be integrated together, and/or may be integrated with other logic. In some embodiments, the media content events 316 may be stored in a separate memory medium. Other media content storage devices 110 may include some, or may omit some, of the above-described components. Further, additional components not described herein may be included in alternative embodiments of the media content storage device 110.

In embodiments of the media content storage device 110 that are configured to receive broadcasted media content streams 116, the media content streams 116 are received by the media content stream interface 302. A plurality of tuners (not shown) in the media content stream interface 302 selectively tune to one of the media content streams 116 in accordance with instructions received from the processor system 304. The processor system 304, executing the media content event storage logic 312, parses out program content associated with a selected media content event of interest. The media content event of interest is then stored into the media content events 316 memory medium.

Alternatively, or additionally, embodiments of the media content storage device 110 may be configured to receive a media content stream 116 directly from the media content broadcast facility 106 and/or directly from another media content source (not shown). The processor system 304, executing the media content event storage logic 312, stores the media content events into the media content events 316 memory medium.

Embodiments of the communication network interface 310 are configured to communicatively couple the media content storage device 110 with the media content event availability tracker 112, the media devices 102, and/or the media devices 104, via the communication link 120 established through the communication system 114. The communication network interface 310 is preferably configured to accommodate a plurality of communication links to a plurality of media devices 102 so that each media device 102 may receive a requested initial portion of selected media content events. The communication network interface 310 may be any suitable communication device, component, or system operable to communicate over the communication system 114.

Embodiments of the broadcast facility interface 308 are configured to communicatively couple the media content storage device 110 with the media content broadcast facility 106, via the communication link 122. The broadcast facility interface 308 may be any suitable communication device, component, or system operable to communicate over the communication link 122 established with the media content broadcast facility 106.

In operation, an exemplary embodiment of the media content storage device 110 is configured to store a plurality of initial portions of selected media content events. The media content event storage logic 312 manages storage of the selected media content events. In an exemplary embodiment, the media content event storage logic 312 may employ a database management system to track and manage a plurality of stored media content events.

Depending upon the configuration of the media content event storage logic 312, initial portions may be defined by a predefined duration, a percentage of the total duration of a media content event, or by the entirety of the media content event. For example, the first ten minutes, or another predefined duration, of specified media content events may be stored. Alternatively, or additionally, twenty five percent, or another predefined percentage, or the media content event of interest may be stored. Alternatively, or additionally, one or more of the selected media content events may be stored in their entirety. Alternatively, or additionally, the media content storage device 110 may have stored the media content events prior to the broadcasting of the media content events in the media content stream 116.

The identification of selected media content events, and the associated duration of each stored initial portion, may be specified in instructions received from the media content event availability tracker 112 and/or the media content broadcast facility 106. For example, instructions may be received to store the first ten minutes of a plurality of media content events based upon specified identifiers, such as the title of the media content events, a program identifier of the media content events, or the like. Alternatively, or additionally, one or more particular channels may be specified for which the initial portion of the selected media content events provided on the specified channels are stored. Alternatively, or additionally, for one or more specified channels, the portion of each media content event beginning on the hour, and/or beginning of the half hour, may be stored.

Further, the media content event storage logic 312 may manage erasure, deletion, or removal of previously stored initial portion of the selected media content events. For example, after conclusion of a particular media content event, an exemplary embodiment may be configured to delete, erase, or otherwise remove the stored initial portion of that particular media content event. Alternatively, or additionally, stored initial portions of the selected media content events may be retained for a predefined duration. Upon expiration of the duration, the initial portion of the selected media content event may be deleted, erased, or otherwise removed.

The media content event retrieval logic 314 manages communication of the initial portion of the selected media content event to requesting media devices 102. The media content event retrieval logic 314 is executed to process each request to establish a communication link 120 with a requesting media device 102. If the request is valid, the communication link 120 is established. For example, an identifier, security code, or the like may be included in the initial request that indicates that the media device 102 is authorized to receive the initial portion of the requested media content event. Security features may be used to verify that the electronic device that is attempting to establish a communication link is a bonafide media device 102. Accordingly, access by unauthorized media devices 102, impostor electronic devices, or the like, may be denied.

Once the communication link 120 is established with the requesting media device 102, the media content event retrieval logic 314 processes the request to identify the initial portion of the selected media content event. If the requesting media device 102 is authorized to receive the requested initial portion of the selected media content event, then the media content event retrieval logic 314 may retrieve the initial portion from the media content events 316 portion of the memory 306. Authorization of a particular media device 102 to receive a requested initial portion of the selected media content event. Such authorization may be based upon services subscribed by the requesting media device 102, such as premium channels or pay per view media content events. Alternatively, or additionally, authorization may be based on other factors, such as parental control settings in effect at the requesting media device 102.

The media content event retrieval logic 314 may process the retrieved initial portion of the selected media content event into a format that is suitable for communication over the communication network 115. Further, the media content event retrieval logic 314 may process the retrieved initial portion of the selected media content event into a format of the media content that is required by the requesting media device 102. For example, the media device 104 may receive the media content event over the satellite broadcast system 124. However, the requesting media device 102 may be configured to receive the media content stream 116 over the cable system 140, and thus, may be configured to receive the media content event in a format that is different than the same media content event received by the media device 104. Accordingly, the media device 104 may process the retrieved initial portion into a format used by the requesting media device 102.

In an exemplary embodiment, the media content storage device 110 may be located at any convenient location so as to have access to the communication system 114 and/or the media content broadcast facility 106. Some embodiments may be co-located at, located within, and/or may be an integrated component of, the media content broadcast facility 106.

In some embodiments, a plurality of media content storage devices 110 may be employed. For example, the plurality of media content storage devices 110 may be geographically dispersed so as to be in proximity to a plurality of media devices 102, 104. Alternatively, or additionally, the plurality of media content storage devices 110 may be configured to receive and store different ones of the plurality of media content events.

FIG. 4 is a block diagram of an exemplary embodiment of the media content event availability tracker 112. The exemplary media content event availability tracker 112 is configured to manage storage of the initial portion of the selected media content events in the media devices 104 and/or the media content storage device 110, and respond to requests to communicate a selected initial portion of a specified media content to the requesting media device 102. The non-limiting media content event availability tracker 112 comprises a processor system 402, a memory 404, an optional broadcast facility interface 406, and a communication network interface 408. The memory 404 comprises portions for media content event storage control logic 410, media content retrieval authorization logic 412, and initial media content event location database 414. In some embodiments, the media content event storage control logic 410 and the media content retrieval authorization logic 412 may be integrated together, and/or may be integrated with other logic. In some embodiments, the initial media content event location database 414 may be stored in a separate memory medium. Other media content event availability trackers 112 may include some, or may omit some, of the above-described components. Further, additional components not described herein may be included in alternative embodiments of the media content event availability tracker 112.

Embodiments of the communication network interface 408 are configured to communicatively couple the media content event availability tracker 112 with the media content storage devices 110, the media devices 102, and/or the media devices 104, via the communication link 120 established through the communication system 114. The communication network interface 408 is preferably configured to accommodate a plurality of communication links to a plurality of media devices 102 so that the media devices 102 may concurrently communicate with the media content event availability tracker 112. Further, the communication network interface 408 is preferably configured to accommodate a plurality of communication links to a plurality of media devices 104 and/or media content storage devices 110 so that storage of the initial portion of the selected media content events may be managed. The communication network interface 408 may be any suitable communication device, component, or system operable to communicate over the communication system 114.

Embodiments of the broadcast facility interface 406 are configured to communicatively couple the media content event availability tracker 112 with the media content broadcast facility 106 via the communication link 144. The broadcast facility interface 406 may be any suitable communication device, component, or system operable to communicate over the communication link 144 established with the media content broadcast facility 106.

In operation, an exemplary embodiment of the media content event availability tracker 112 is configured to manage storage of a plurality of initial portions of selected media content events at the plurality of media devices 104 and/or media content storage devices 110 be execution of the media content event storage control logic 410. In an exemplary embodiment, the media content event storage control logic 410 may specify selected media content events for storage, and/or may define the duration of the initial portions of the media content events. Durations of an initial portion of a media content event may be defined by a predefined duration, by a percentage of the total duration of a media content event, or by the entirety of the media content event.

In an exemplary embodiment, the media content event availability tracker 112 stores in the initial media content event location database 414 information that identifies which particular one of the plurality of media devices 104 and/or media content storage devices 110 have stored, or are storing, the initial portion of a particular media content event. The media content event storage control logic 410 is configured to track storage locations of the initial portions of a large number of media content events. Accordingly, when an authorized requesting media device 102 requests the initial portion of the selected media content event, the media content event availability tracker 112 can identify one or more locations (which ones of the plurality of media devices 104 and/or media content storage devices 110) where the specified initial portion is stored by performing a lookup operation or the like into its initial media content event location database 414.

Once one or more of the media devices 104 and/or media content storage devices 110 that are storing the initial portion of the selected media content event have been identified, the reply may be generated and communicated to the requesting media device 102. The reply identifies the location, such as an address or the like, of one or more of the media devices 104 and/or media content storage devices 110 that have stored the requested initial portion of the selected media content event. The reply to the requesting media device 102 may also include information to establish the communication link 120 between the requesting media device 102 and the identified media devices 104 and/or media content storage devices 110 that have stored the initial portion of the selected media content event.

Alternatively, or additionally, the media content event availability tracker 112 may provide media content event storage instructions to selected ones of the plurality of media devices 104 and/or media content storage devices 110 to store the initial portion of a particular media content event. For example, a popular movie may be anticipated to be accessed by an estimated number of requesting media devices 102. Based on the estimated number of requesting media devices 102 that are anticipated to be requesting the initial portion of the movie, the media content event availability tracker 112 may generate and communicate instructions to a corresponding number of the plurality of controlled media devices 104 and/or media content storage devices 110 to store the initial portion of the movie. Accordingly, when authorized requesting media devices 102 request access to the initial portion of the movie, a sufficient number of media devices 104 and/or media content storage devices 110 are available to provide access for all of the requesting media devices 102.

Selection of specific ones of the plurality of media devices 104 that may be sent media content event storage instructions may be based on the current operating status of the media device 104. For example, a particular media device 104 with two tuners 226a, 226b may be operating in a standby mode where its respective user is not using the media device 104. Accordingly, the tuners 226a, 226b of that media device 104 which are not being used may be controlled by the media content event availability tracker 112. The media content event availability tracker 112 may send that media device 104 a media content event storage instruction that causes the media device 104 to tune one of its tuners 226a, 226b to receive the specified media content event from the received media content stream 116, and then store the initial portion of the specified media content event in its program buffer 208 and/or its DVR 210. Additionally, the media content event availability tracker 112 may send that media device 104 another media content event storage instruction that causes the media device 104 to tune its other tuner 226 to receive a second specified media content event from the received media content stream 116, and then store the initial portion of the specified second media content event into its program buffer 208 and/or its DVR 210. Information corresponding to the media content event storage instructions that identifies the media devices 102 and the media content event that they have stored may then be saved into the initial media content event location database 414. Accordingly, when a requesting media device 102 request the initial portion of the selected media content event stored on that particular media device 104, the reply that is sent to the requesting media device 102 that identifies that particular media device 104.

The identification of selected media content events, and the associated duration of each stored initial portion, may be specified by the media content event availability tracker 112 in an exemplary embodiment. For example, media content event storage instructions may be sent to a media device 104 to store the first ten minutes of a specified media content event.

Further, the media content event storage control logic 410 may manage erasure, deletion, or removal of previously stored initial portions of the selected media content events on particular media devices 104. For example, after conclusion of a particular media content event, an exemplary embodiment may be configured to communicate a media content event storage instruction to those ones of the media devices 104 and/or media content storage devices 110 to delete, erase, or otherwise remove the stored initial portion of that particular media content event.

The media content retrieval authorization logic 412 manages communication between the media content event availability tracker 112 and the requesting media devices 102. The media content retrieval authorization logic 412 is executed to process each request received from a media device 102 to establish a communication link 120. If the request is valid, the communication link 102 is established. For example, an identifier, security code, or the like may be included in the initial request that indicates that the media device 102 is authorized to request the initial portion of the selected media content event. Security features may be used to verify that the electronic device that is attempting to establish a communication link is a bonafide media device 102. Accordingly, access by unauthorized media devices 102, impostor electronic devices, or the like, may be denied.

Once the communication link 120 is established with the requesting media device 102, and if the requesting media device 102 is authorized to receive the requested initial portion of the selected media content event, then the media content event availability tracker 112 may generate and communicate information so that the authorized media device 102 may contact an identified one of the media devices 104 and/or the media content storage devices 110 to receive the requested initial portion of the selected media content event. Such authorization may be based upon services subscribed by the requesting media device 102, such as premium channels or pay per view media content events. Alternatively, or additionally, authorization may be based on other factors, such as parental control settings in effect at the requesting media device 102.

In some embodiments of the media content event recovery system 100, a plurality of media content event availability trackers 112 may be employed. A plurality of media content event availability trackers 112 may be used to accommodate different geographic regions, to accommodate different technologies of the communication system 114, and/or to accommodate different technologies of the media devices 102, 104.

Some embodiments of the media content event availability tracker 112 are configured to receive acknowledgements or replies from the media devices 104 indicating what particular initial portion of the media content events have been stored. Other embodiments may be configured to receive information from the media devices 104 and/or the media content storage devices 110 that provide usage information by requesting media devices 104. For example, providing the initial portion of a specified media content event may be associated with a pay for use or premium service. Thus, the media content event availability tracker 112 may track usage so that a requesting media device 102 may be appropriately billed for the service of receiving the initial portion of a specified media content event.

Figures 5, 6:
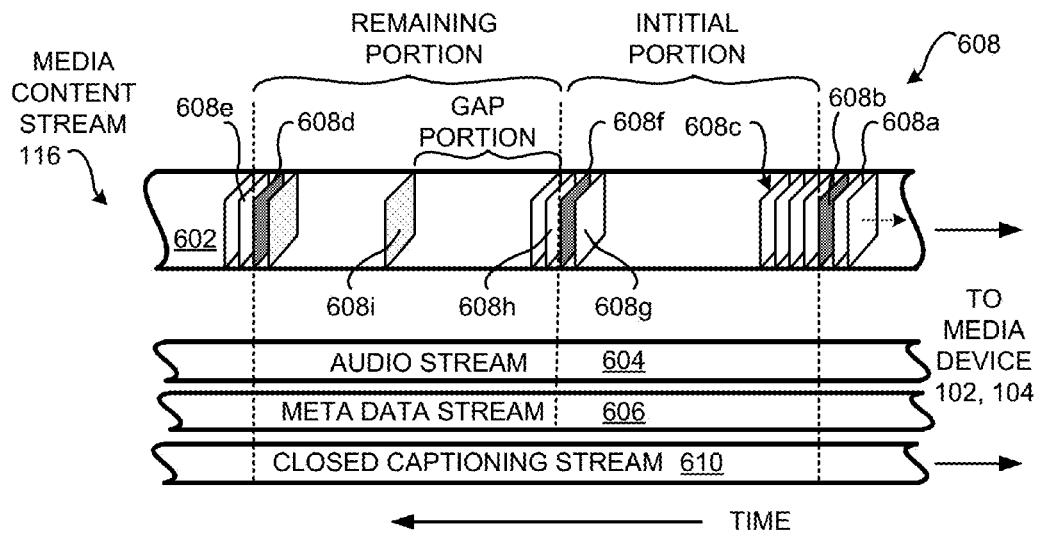
FIG. 5 is a block diagram of an exemplary EPG generated by an embodiment of the media device.
FIG. 6 conceptually illustrates a media content stream that communicates, transports, or otherwise carries, the media content event to the media device.

FIG. 5 is a block diagram of an exemplary EPG 230 generated by an embodiment of the media device 102. The EPG 230 presents program information identifying a plurality of media content events currently available, and available in the near future, for a plurality of programming channels. The programming channels are identified by a suitable identifier, such as the name of the programming station or the like. Here, the seven channels are identified as stations A-G. The media device 102 is configured to present programming that is provided by many different programming channels, sometimes even several hundreds of different programming channels. Accordingly, the user is able to navigate about the EPG 230 so as to be able to view selectable media content events provided on one or more programming channels.

In the exemplary EPG 230, the current time is 8:20 p.m. on April 1. Programs that are available at the current time of 8:20 p.m. are identified on the EPG 230. In the exemplary EPG 230, programs currently available are shown adjacent to the programming channel on which they are available. For example, program A1 is currently available on the programming channel identified as "Station A" (and so on).

The EPG 230 illustrates available media content events by presenting the first program entries on the EPG 230 based on a predefined time increment, such as an hour or a half hour. For example, since the current time is 8:20 p.m., the exemplary EPG 230 begins presentation of the program scheduling information at 8:00 p.m. Thus, the viewer is able to appreciate which media content events are currently available for viewing, and more particularly, which media content events have already started.

The EPG 230 also provides information pertaining to media content events that will be available in the future. The future time period extends out to some predefined time, which is limited by the available display size for the EPG 230. In this simplified example, the time available for showing future program information extends out for four and one half hours, or out to 12:30 a.m.

In this simplified example, the EPG 230 indicates that some of the media content events may have their initial portions available for viewing. The exemplary EPG 230 indicates those media content events that have their initial portions available using the exemplary star at the right hand side of the program listing block. In some embodiments, the media content provider may appreciate that certain programs are likely to be popular, and accordingly, may schedule one or more of the media devices 104 and/or the media content storage devices 110 to store the initial portions of those media content events. When the EPG information is being downloaded to the plurality of media device 102, 104, the availability of the initial portions may be indicated on the presented EPG 230. Alternatively, or additionally, EPG updates indicating that an initial portion of selected media content event is will be available may be separately communicated from time to time to the media devices 102, 104.

For example, if the user of the media device 102 selects the media content event "Program A-1" for presentation. An exemplary graphical icon 502, presented as a star, indicates to the user that the initial portion of the Program A-1 is available. Depending upon the embodiment and/or the current configuration of the media device 102, the media device 102 may initiate presentation of the Program A-1 at its current presentation point (corresponding to 8:20 p.m.). In some embodiments, the user may at a later time, cause the media device 102 to access and present the initial portion of the Program A-1. Alternatively, the media device 102 may automatically initiate presentation of the Program A-1 at its beginning (which requires accessing one of the media devices 104 and/or the media content storage devices 110 that has stored the initial portion of the Program A-1). Alternatively, the media device 102 may provide the user the choice to begin presentation of the Program A-1 at its beginning or at its current presentation point. For example, a pop-up confirmation or selection window may be presented to the user so that the user may select the initial point of presentation of the Program A-1.

Depending upon the operating extent of the media content event recovery system 100, the initial portion of some media content events may not be available. For example, if the number of operational media devices 104 is limited, and/or the if the storage capacity of the media content storage devices 110 is limited, the initial portions of some media content events may not be stored. For example, the initial portion of the "Program E-1" is not available, as indicated by the absence of the graphical indicator. If the user selects the media content event "Program E-1" for presentation, then presentation is initiated at the current time of 8:20 p.m.

Some of the media content events scheduled for future presentation indicate that their initial portions will be available. For example, the "Program D-3" is scheduled to begin presentation at 11:00 p.m. The graphical icon 502 indicates that the initial portion is available. Here, some embodiments may have one or more of the media devices 104 set to record the Program E-1. Accordingly, when the Program E-1 begins, its initial portion will be saved on those media device 104. Or, the media content provider may appreciate that the Program E-1 is going to be a popular program, and accordingly, may schedule one or more of the media devices 104 and/or the media content storage devices 110 to store the initial portion of the Program E-1. Accordingly, the user may appreciate that they do not necessarily need to configure their media device 102 to receive the Program E-1 as it's initial portion is being communicated over the broadcast system 108.

The availability of the initial portion of a media content event may be indicated on the EPG 230 using any suitable graphical icon 502. The graphical icon 502 may present text, may present an image of an object, may present an avatar, and/or may present a short video clip or animation.

If the graphical icon 502 is not shown on the EPG 230 for a particular media content event, the initial portion of the media content event may be available. That is, the omission of the graphical icon 502 on the EPG 230 does not mean that the initial portion of the media content event is not available from the media content event recovery system 100.

The information provided in the EPG information 222 portion of the memory 206 (FIG. 2), is updated from time to time. The EPG information 222 includes the start time of the available media content events. An exemplary embodiment of the media device 102, the media devices 104, and/or the media content event availability tracker 112 are configured to determine the duration of the initial portion of the media content event based on the starting time of the media content event and information provided by the requesting media device 102. In some embodiments, the information in the EPG information 222 may include an identifier of a first video frame or other marker, trigger, indicia or other identifiable portion of the media content stream 116.

FIG. 6 conceptually illustrates a media content stream 116 that communicates, transports, or otherwise carries, the media content event to the plurality of media devices 102, 104. In exemplary embodiments, the media content stream 116 comprises at least a video stream 602, a corresponding audio stream 604, and a corresponding metadata stream 606.

In exemplary embodiments, the video stream 602 is comprised of a plurality of serially sequenced video frames 608. Each video frame 608 has data or information used to render and present a particular image of the media content event. The video frames 608 may be configured in accordance with the moving picture experts group (MPEG) formats, the material exchange format (MXF), and other packetized video formats.

Further, each of the video frames 608 may optionally include information, such as a header and/or footer, that identifies the beginning and end of the encapsulated video image data of the video frame 608. The video frames 608 may also include other information that uniquely identifies the particular video frame 608 among the plurality of video frames 608. For example, a time stamp or the like may be used to identify each individual video frame 608. Alternatively, or additionally, information may be included in the videos frame 608 that identify relative location of each video frame 608 in the media content stream 116, such as the first one or last one of the video frames 608. Accordingly, when the video frames 608 are serially presented so as to create a moving picture, the video frames 608 may be presented in the correct sequence.

The audio stream 604 may include spoken words, music, and background sounds. The audio stream 604 is sequenced with the video frames 608 such that spoken words, music, and background sounds of the audio stream 604 correspond in time with the moving picture. Information may be included in the audio stream 604 that identifies its relative location of the audio information in the media content stream 116, such as a relative location of the audio information with respect to the video frames 608. The audio stream 604 may comprise a plurality of different audio channels, such as a plurality of audio channels used by a surround sound system to produce the audio portion of a movie or the like.

Some media content streams 116 may include the metadata stream 606. The metadata stream 606 contains various information of interest associated with the media content event. Information in the meta metadata stream 606 may include the starting and ending times of the media content event, identifier information of the media content event, and/or information pertaining to particular ones or groups of the video frames 608. In some embodiments, information identifying the first one, or a selected one, of the video frames 608 may be included to facilitate determination of the duration of the initial portion of media content event and/or to identify the start of the initial portion of the media content event.

An optional closed captioning stream 610 is also conceptually illustrated as part of the media content stream 116. The closed captioning stream 610 is typically a textual presentation of the words of the audio stream 604 for hearing impaired viewers or for viewers in an area with relatively loud ambient noise levels, such as a bar or the like. The words of the closed captioning stream 610 are sequenced so as to generally correspond to the spoken words of the audio stream 604.

In an exemplary embodiment, during normal operation of the media device 102, each particular video frame 608 that presents a scene is serially received at the media content stream interface 202. Each serially received video frame 608 is processed by the processor system 204 to render an image that is suitable for presentation on the display 228 of the media presentation device 118 (FIG. 2).

During normal operation, individual video frames 608 are serially received in real time, or in substantially real time, over the broadcast system 108. Since a plurality of media content events follow each other in a serial fashion, when one of the media content events ends with a concluding video frame 608a, then the next media content event begins with an initial video frame 608b. As the broadcasting of the media content event continues, subsequent video frames 608c are broadcast and received at the media devices 102, 104. The stream of video frames 608 continues until a concluding video frame 608d is received. That particular media content event then ends and is followed by a stream of video frames 608e corresponding to the next media content event.

When the user of the media device 102 tunes their media device 102 to receive a media content event that is already underway, the initial portion of the media content event will have already been broadcasted. For example, the user may tune to the media content event in the exemplary media content stream 116 of FIG. 6 such that the first received or first presentable image of the newly selected media content event corresponds to the video frame 608f. The video frame 608g is not receivable since that video frame 608g has already been broadcasted. Accordingly, the initial portion of the media content event, corresponding to video frames 608a-608g, are not available to the media device 102.

Presentation of the selected media content event, in the absence of an invocation of the various embodiments of the media content event recovery system 100, begins at the video frame 608f. The next video frame 608h is then presented, and so on, until the last video frame 608d is presented.

Upon invocation of the media content event recovery system 100, an exemplary embodiment of the media device 102 initiates storage of the remaining portion of the media content event (for example, corresponding to the video frames 608f-608d). Or, the beginning of remaining portion of the media content event may be defined by a later selected one of the video frames 608. For example, the storing may begin at the point in the video stream 602 where the user initiates the retrieval of the initial portion of the media content event. Thus, in this example, the video frame 608i might be considered as the first frame of the remaining portion of the media content event.

When the media device 102 generates a request for the initial portion of the media content event, an exemplary embodiment includes the identity of the media content event that is of interest. The identifying information of the media content event may be obtained from the EPG information 222 in an exemplary embodiment. Alternatively, or additionally, the information may be obtained from information in the currently received portion of the meta data stream 606.

However, since the media device 102 cannot access previously broadcasted portions of the media content stream, the media device 102 may not be able to specifically identify the video frames 608b-608g. Accordingly, information may be needed at some point so that the initial portion of the media content event, corresponding to video frames 608b-608g (and the associated information of the audio stream 604, the metadata stream 606, and/or the closed captioning stream 610) may be identified by the responding media content event availability tracker 112, the media device 104, and/or media content storage device 110.

In an exemplary embodiment, the media device 102 may include in its request information that identifies the beginning of the remaining portion of the media content event. An exemplary embodiment may provide information that identifies the first video frame 608f that it has received (or the video frame 608i corresponding to the time that the user initiates the retrieval of the initial portion of the media content event). Alternatively, or additionally, the beginning of the remaining portion of the media content event may be based on a time of day or the like.

Alternatively, or additionally, the media device 102 may look to the EPG information 222 (FIG. 2) and indicate the starting time of the media content event. Other available information may be used to identify the start of the initial portion of the media content event.

Alternatively, or additionally, the media device 102 may include in its request the duration of the initial portion of the media content. The duration may be determined by the media device 102 based on the start time of the media content event as indicated in the EPG information 222. Other information available to the media device 102 may also be used to determine and indicate the duration of the initial portion of the media content event.

The start and/or duration of the initial portion of the media content event may also be specified in the request from the media device 102 in other manners. For example, if other markers, triggers, or other identifiers are included in the audio stream 604, the metadata stream 606, and/or the closed captioning stream 610, that information may alternatively, or additionally, be used to define the start time and/or duration of the initial portion of the media content event.

In an exemplary embodiment, once the media device 102 has provided the start time and/or duration of the initial portion of the media content event, the media content event availability tracker 112 may identify those media devices 104 and/or media content storage devices 110 that have stored the initial portion of the requested media content event with a sufficient duration so that the entirety of the initial portion of the media content event can be provided to the requesting media device 102. That is, once the start and end times, and/or the duration, of the initial portion of the requested media content event has been determined or specified in the request from the media device 102, the media content event availability tracker 112 can generate a reply to the media device 102 so that the media device can retrieve the initial portion of the media content event, corresponding to video frames 608b-608g, from a selected one of the identified media devices 104 and/or media content storage devices 110.

Alternatively, or additionally, the request for the initial portion of the media content event may provide information that corresponds to the beginning of the remaining portion of the media content event. For example, the request may provide information that identifies the video frame 608f. In another embodiment, the request may indicate a time that corresponds to the beginning of the remaining portion of the media content event. Or, a time stamp or the like corresponding to the time of communication of the request may be used.

In such embodiments, the media content event availability tracker 112, the responding media device 104, and/or the responding media content storage device 110 may determine the start time and/or the duration of the initial portion of the requested media content event. For example, the media content event availability tracker 112 may use program scheduling information to identify the start of the media content event. Alternatively, or additionally, the media content event availability tracker 112 may have information that identifies the first video frame 608b of the media content event. This information may be included in the response returned to the requesting media device 102.

In other embodiments, the request sent to the responding media device 104 and/or media content storage device 110 may indicate the beginning time of the remaining portion of the media content event. The start time of the requested media content event may be determinable by the responding media device 104 and/or media content storage device 110 based upon the EPG information 222 or from other information, such as metadata information. Alternatively, or additionally, information associated with and/or identifying the first video frame 608f of the remaining portion of the media content event may be provided. Since the responding media device 104 and/or media content storage device 110 has stored the initial portion of the media content event, that responding media device 104 and/or the media content storage device 110 may identify the first video frame 608b. Accordingly, the responding media device 104 and/or the media content storage device 110 may provide the video frames 608b-608g (and the associated information of the audio stream 604, the metadata stream 606, and/or the closed captioning stream 610) to the requesting media device 102.

In some embodiments, the responding media device 104 and/or media content storage device 110 provides additional video frames 608 (and the associated information of the audio stream 604, the metadata stream 606, and/or the closed captioning stream 610) to the requesting media device 102 that extends beyond the beginning of the remaining portion of the media content event. Thus, the media device will have access to the video frames 608f (and the subsequent video frames 608h) from either its own memory medium or from the initial portion of the media content event received from the responding media device 104 and/or media content storage device 110.

Once the initial portion of the media content event (based on information identifying the video frames 608b-608g, for example) has been communicated to the media device 102, the initial portion of the media content event may be presented to the user (or may be stored by the media device 102). When the last video frame 608g of the received initial portion of the media content event has been presented (or stored), then presentation may continue with the previously stored remaining portion of the media content event (that begins with the video frame 608f).

The corresponding initial portion of the audio stream 604, metadata stream 606, and/or the closed captioning stream 610 may be similarly identified and communicated to the requesting media device 102. For example, the audio portion of the initial portion of the media content event is presented in synchronism with presentation of the received video frames 608b-608g.

In the various embodiments, presentation of the initial portion of the media content event may transition to the presentation of the remaining portion of the media content event using any suitable technology or process. Preferably, there will be little or no substantial disruption in the presentation of the media content event during the transition. If the formats of the received initial portion of the media content event and the stored remaining portion of the media content event are the same, then an exemplary embodiment may buffer the initial video frame 608f, for example, so that presentation of the video frame 608f begins in sequence with, and with proper timing synchronization, with the last video frame 608g of the received initial portion of the media content event.

However, the formats of the received initial portion of the media content event and the stored remaining portion of the media content event may be different. For example, but not limited to, the received initial portion of the media content event may be in a standard definition format, whereas the stored remaining portion of the media content event may be in a high definition format. Accordingly, the user may perceive the transition between the initial portion of the media content event and the remaining portion of the media content event.

Some embodiments of the media content event recovery system 100 may be configured to fill gaps in presentation of a media content event. For example, the user of the media device may switch to a different media content event, such as when channel surfing or selecting an alternative media content event using the presented EPG 230. In the user determines that they would rather continue presentation of the previous media content event, then embodiments may be configured to request the "gap" portion of the media content event. For example, the user may have changed channels or selected an alternative media content event that corresponds to the video frame 608h. They may then wish to resume presentation of the media content event at a point that corresponds to the video frame 608i. Accordingly, embodiments of the media content event recovery system 100 may be configured to generate a request for a gap portion of the media content event. The gap portion may be identified by the identifiers of the video frames 608h-608i. A suitable request for the gap portion may be constructed and communicated to the media content event availability tracker 112, and the tracker may identify one or more of the media devices 104 and/or the media content storage devices 110 that have stored the gap portion (corresponding to the video frames 608h-608i). Then the media device 102 may establish the communication link 120 to a selected one of the media devices 104 and/or the media content storage devices 110, and provide a request for the gap portion (corresponding to the video frames 608h-608i).

Some embodiments of the media content event recovery system 100 may be configured to request and store the initial portion of the media content event if the user starts a record function of the media content event after the broadcasting of the initial portion of the media content event. For example, the user may be currently viewing a first media content event, and then decide that they wish to record a second media content event on their DVR 210 (FIG. 1). In situations where the initial portion of the second media content event has already been broadcast prior to initiation of the recording function, embodiments are configured to access and store the initial portion of the second media content event as part of the recording process. The accessing and storing of the initial portion of the second media content event may be automatic, and/or may require a confirming action on the part of the user of the media device 102.

Some embodiments of the media content event recovery system 100 may be configured to provide the initial portion of the media content event in segments that are provided by different ones of the media devices 104 and/or the media content storage devices 110. For example, a first one of the media device 104 may provide a first part of the initial portion of the media content event, while a second media device 104 may provide a second portion of the initial portion of the media content event.

An exemplary situation may arise, for example, where a first media device may have only stored a first part of the initial portion of the media content event (such as in the event the user of the first media device 104 has changed a channel or switched to a different media content event). However, a second media device 104 may have stored all of the initial portion of the media content event. In the event that the second media device 104 is already being accessed by a second media device 102, the first media device 102 cannot access the second media device 104. However, the first media device 102 may access the first media device 104 to retrieve the first part of the initial portion of the media content event. By the time the first media device 102 has received the first part of the initial portion of the media content event from the first media device 104, the second media device 104 may then be available to provide the second part of the initial portion of the media content event. For example, the second media device 102 may have completed communication of the entire initial portion of the media content event, and accordingly, may have ended its respective communication link 120 to the second media device 104. The first media device 102 may then establish a communication link 120 to the second media device 104, and thus receive the second part of the initial portion of the media content event.

It should be emphasized that the above-described embodiments of the media content event recovery system 100 are merely possible examples of implementations of the invention. Many variations and modifications may be made to the above-described embodiments. All such modifications and variations are intended to be included herein within the scope of this disclosure and protected by the following claims.

The invention claimed is:

1. A media content event availability tracker that communicates initial portions of media content events over a communication system to a plurality of media devices in response to receiving user requests, comprising:
    a communication network interface that receives a user request from a first media device for presentation of a media content event made via a presented electronic program guide (EPG) that indicates that the media content event is being currently broadcast over a broadcast system, wherein the first media device is a member of the plurality of media devices, wherein the request communicated to the media content event availability tracker comprises information that is associated with a first video frame of a remaining portion of a media content event that is being stored at the first media device during the current broadcast of the media content event;
    a memory that stores information that identifies a second media device selected from the plurality of media devices, wherein the second media device has stored an initial portion of the media content event being currently broadcast over the broadcast system; and
    a processor system communicatively coupled to the communication network interface and the memory, wherein the processor system:
        identifies a duration of the initial portion of the media content event that has previously been communicated over the broadcast system based on the information associated with the first video frame of the remaining portion of the media content event that has been stored at the first media device;
        selects the second media device that has stored the initial portion of the media content event during broadcast of the initial portion over the broadcast system; and
        communicates a response to the first media device, wherein the response identifies the second media device and includes information that enables the first media device to communicatively couple to the second media device to retrieve the initial portion of the media content event defined by the identified duration.

2. The media content event availability tracker of claim 1, wherein the first media device, after receiving the response from the media content event availability tracker, establishes a communication link to the second media device over the communication system based upon the response that identifies the second media device,
    wherein the initial portion of the media content event defined by the identified duration is communicated from the second media device to the first media device in response to establishing the communication link, and
    wherein the initial portion of the media content event is communicated over the communication link.

3. The media content event availability tracker of claim 1, wherein the processor system communicates an authorization to the second media device, wherein the authorization indicates that the second media device is authorized to communicate the initial portion of the media content event to the first media device.

4. The media content event availability tracker of claim 1, wherein the memory further stores information that identifies at least one media content storage device that has stored at least the initial portion defined by the identified duration of the media content event identified in the received user request communicated from the first media device, and
    wherein the response communicated by the processor system identifies the at least one media content storage device and includes information that enables the first media device to alternatively communicatively couple to the at least one media content storage device to retrieve the initial portion of the media content event.

5. The media content event availability tracker of claim 1, further comprising:

a broadcast facility interface communicatively coupled to the processor system,
wherein the processor system communicates information corresponding to the user request from the first media device for presentation of the media content event to a media content broadcast facility, and
wherein the communicated information is used for billing the user for their request for presentation of the media content event.

6. The media content event availability tracker of claim 1,
wherein the memory further stores information that identifies a media content storage device that has stored at least the initial portion defined by the identified duration of the media content event identified in the received user request communicated from the first media device,
wherein response to determining that no second media device has recorded the initial portion of the media content event, the processor system identifies the media content storage device that has stored at least the initial portion of the media content event, and
wherein the response communicated by the processor system identifies the media content storage device and includes information that enables the first media device to communicatively couple to the media content storage device to retrieve the initial portion of the media content event.

7. The media content event availability tracker of claim 6, wherein the media content storage device is receiving a broadcast of the media content event and is storing the media content event as the broadcasting media content event is being received at the media content storage device.

8. The media content event availability tracker of claim 6, wherein the media content storage device has previously stored the media content event.

9. The media content event availability tracker of claim 1,
wherein the communication network interface receives, prior to receiving the user request from the first media device for presentation of the media content event, information from the second media device that indicates that the second media device has stored at least the initial portion of the media content event defined by the identified duration, and
wherein the processor system stores information into the memory that identifies the second media device as having the stored initial portion of the media content event.

10. The media content event availability tracker of claim 1,
wherein the processor system generates a request to the second media device to store the broadcasting initial portion of the media content event, and
wherein the communication network interface communicates the request to the second media device prior to the start of the broadcast of the media content event so that the second media device stores at least the initial portion of the media content event as the media content event is being broadcast.

11. The media content event availability tracker of claim 10,
wherein the request to the second media device to store at least the initial portion of the media content event as the media content event is being broadcast includes a predefined duration, and
wherein the second media device ends the storing of the initial portion of the media content event at the end of the predefined duration.

12. The media content event availability tracker of claim 10,
wherein the request to store the broadcasting initial portion of the media content event includes instructions to operate one of a plurality of tuners residing in the second media device,
wherein the instructions cause the tuner to tune itself to receive a media content stream with the broadcasting media content event.

13. The media content event availability tracker of claim 10,
wherein the communication network interface receives, after communicating the request to the second media device to store the initial portion of the media content event, information from the second media device that indicates that the second media device has stored at least the in initial portion of the media content event.

14. The media content event availability tracker of claim 10,
wherein the request to store the broadcasting initial portion of the media content event is a first request that is communicated to the second media device,
wherein the processor system, after a conclusion of the broadcast of the media content event, generates a second request to delete or erase at least the stored initial portion of the media content event, and
wherein the communication network interface communicates the second request to second media device.

15. The media content event availability tracker of claim 1,
wherein the processor system generates a request to store the broadcasting initial portion of the media content event, and
wherein communication network interface communicates the request to a selected plurality of media devices that are members of the plurality of media devices prior to the start of the broadcast of the media content event, and
wherein the processor system selects the second media device from one of the selected plurality of media devices that received the request to store the broadcasting initial portion of the media content event.

16. The media content event availability tracker of claim 1, wherein the processor system:
determines whether the requesting first media device is authorized to receive the broadcasting media content event,
wherein the response that identifies the second media device and includes information that enables the first media device to communicatively couple to the second media device to retrieve the initial portion of the media content event that is communicated from the media content event availability tracker to the first media device only if the first media device is authorized to receive the broadcasting media content event.

17. A method of communicating portions of media content events over a communication system that couples a plurality of media devices with a media content event availability tracker, comprising:
receiving, at the media content event availability tracker, a user request from a first media device for presentation of a media content event,
wherein the user request is made via a presented first electronic program guide (EPG) that indicates that the media content event is being currently broadcast over a broadcast system, wherein the first media device is a member of the plurality of media devices, wherein the request indicates that an initial portion of the media content event has not been saved at the first media device, wherein the request identifies a first video frame of the media content event that is saved at the first media device, and wherein the first video frame identifies a beginning of a remaining portion of the currently broadcasting media content event that is being saved by the first media device;

determining, at the media content event availability tracker, a duration of the initial portion of the specified media content event based on the first video frame identified in the received request;

identifying, at the media content event availability tracker, a second media device that has stored the initial portion of the media content event during broadcast of the initial portion over the broadcast system, wherein the second media device is a member of the plurality of media devices, and communicating a response from the media content event availability tracker to the first media device, wherein the response identifies the second media device and includes information that enables the first media device to communicatively couple to the second media device to retrieve the initial portion of the media content event that is defined by the identified duration.

18. The method of claim 17, wherein the second media device has stored the initial portion of the media content event in response to receiving an instruction from the media content event availability tracker to store the media content event as the media content event is received over the broadcast system.

19. The method of claim 17, wherein the second media device communicates the initial portion of the media content event in response to receiving an authorization from the media content event availability tracker that indicates that the first media device is authorized to receive at least the initial portion of the media content event.

* * * * *